(12) United States Patent
Asplund et al.

(10) Patent No.: US 9,031,162 B2
(45) Date of Patent: May 12, 2015

(54) MOBILITY-RESILIENT MULTI-ANTENNA COMMUNICATIONS

(75) Inventors: Henrik Asplund, Stockholm (SE); Kumar Balachandran, Pleasanton, CA (US); Yngve Selén, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 511 days.

(21) Appl. No.: 13/339,971

(22) Filed: Dec. 29, 2011

(65) Prior Publication Data
US 2013/0170572 A1 Jul. 4, 2013

(51) Int. Cl.
*H04L 27/00* (2006.01)
*H04B 7/04* (2006.01)
*H04B 7/06* (2006.01)

(52) U.S. Cl.
CPC ............ *H04B 7/0456* (2013.01); *H04B 7/0617* (2013.01); *H04B 7/0619* (2013.01); *H04B 7/0658* (2013.01)

(58) Field of Classification Search
CPC .. H04B 7/0456; H04B 7/0658; H04B 7/0619; H04B 7/0617
USPC .......... 375/299, 267, 220; 370/286, 334, 252; 455/561, 562.1, 509
See application file for complete search history.

(56) References Cited

U.S. PATENT DOCUMENTS

| | | | | |
|---|---|---|---|---|
| 7,573,900 B2* | 8/2009 | Kim et al. | | 370/465 |
| 8,059,771 B2* | 11/2011 | Kim et al. | | 375/347 |
| 2003/0214917 A1* | 11/2003 | Molisch et al. | | 370/286 |
| 2003/0215006 A1* | 11/2003 | Raghothaman | | 375/220 |
| 2008/0150803 A1* | 6/2008 | Ban | | 342/383 |
| 2010/0046382 A1* | 2/2010 | Asplund et al. | | 370/252 |
| 2010/0297962 A1* | 11/2010 | Rofougaran | | 455/88 |
| 2012/0196637 A1* | 8/2012 | Bergman et al. | | 455/509 |
| 2013/0109448 A1* | 5/2013 | Garrett et al. | | 455/575.7 |
| 2013/0114513 A1* | 5/2013 | Taoka et al. | | 370/329 |

* cited by examiner

*Primary Examiner* — Shuwang Liu
*Assistant Examiner* — Helene Tayong
(74) *Attorney, Agent, or Firm* — Coats & Bennett PLLC (57) ABSTRACT

The antenna weight selection solution disclosed herein selects antenna weights for a multiple antenna communication system that transmits uplink or downlink data using multiple radiation patterns based on channel variability metrics determined for two or more sets of candidate antenna weights. In so doing the antenna weight selection solution disclosed herein reduces the channel variability associated with data transmissions, and therefore reduces the amount of feedback and/or the feedback rates required for the multiple antenna communication system.

28 Claims, 8 Drawing Sheets

MOBILITY-RESILIENT MULTI-ANTENNA COMMUNICATIONS

TECHNICAL FIELD

The method and apparatus disclosed herein generally relate to multi-antenna communications, and more particularly relate to antenna weight selection for multi-antenna communications.

BACKGROUND

Wireless communication systems often use multiple antennas to improve the system performance. For example, multiple transmit antennas may be used for beam-forming, diversity, and/or Multiple Input Multiple Output schemes to implement spatial multiplexing. In each of these cases, the signals to be transmitted from each antenna are multiplied by an antenna weight, which is often a complex number. The radiation characteristics of the set of antennas used to transmit a certain signal, and the corresponding antenna weights, will determine how the signal is radiated into space, e.g., in what direction(s), with what power, etc. Many of these applications require feedback from the receiving node to the transmitting node. For example, MIMO schemes may require that the transmitting node has full knowledge of the MIMO radio channel or other information that can be used to control the antennas and/or antenna weight selection. To that end, the receiving node may provide channel state information, antenna weight information, pre-coder index information, etc., to the transmitting node.

While multiple antenna solutions have been effectively implemented with two, four, or even eight antennas, using more than eight antennas traditionally increases the overhead required to implement the desired multiple antenna solution. This problem is caused, for example, by the limits associated with the number of pilot signals that can be transmitted within the coherence time of a radio channel, which sets an upper bound to the meaningful number of antennas that can be used. Further, higher numbers of transmission antennas result in narrower radiation patterns, which are generally very sensitive to channel estimation error, quantization errors, and channel variability, e.g., such as caused by the combined effects of multipath propagation and mobility of the transmitting node, the receiving node, and/or other objects within the propagation environment. In addition, the current trend of increasing bandwidths results in more frequency selective channels. Thus, antenna weights used to generate the desired beams are more likely to vary over the frequency band of interest.

Conventional approaches to multi-antenna communications rely on signal quality information, e.g., the signal-to-noise ratio (SNR), and can be limited by the rate at which such information is fed back to the transmitting node. Thus, there remains a need for alternative solutions that reduce the amount of feedback and/or feedback rates.

SUMMARY

The solution disclosed herein reduces the amount of feedback and/or feedback rates required for a multiple antenna system that transmits uplink or downlink data using multiple radiation patterns, each having a shape, direction, etc., controlled by a corresponding set of antenna weights. To that end, an antenna weight selector and antenna weight selection method selects antenna weights for the multiple antenna communication system based on channel variability metrics determined for two or more sets of candidate antenna weights, where sets of candidate antenna weights represent those sets of antenna weights available to a transmitting node. In this manner, the disclosed method and apparatus reduces the channel variability associated with the wireless communications, and therefore, reduces the required amount of feedback and/or feedback rates. Alternatively, the disclosed method and apparatus may make communication with a fixed amount of feedback or a fixed feedback rate possible in more challenging channel conditions.

An exemplary antenna weight selector for transmitting data from a transmitting node in a communication system having multiple transmission antenna elements to a receiving node comprises a channel variability processor and a selection processor. The channel variability processor is configured to determine a channel variability metric for each of two or more sets of candidate weights corresponding to two or more candidate radiation patterns, where a candidate radiation pattern represents the radiation pattern created by applying the corresponding set of antenna weights at the transmitting node. The selection processor is configured to select, from the two or more sets of candidate antenna weights, at least one set of antenna weights for transmitting data to at least one receiving node based on the determined channel variability metrics.

An exemplary method, which selects antenna weights for transmitting data in a communication system from a transmitting node having multiple transmission antenna elements to a receiving node, comprises determining a channel variability metric for each of two or more sets of candidate antenna weights corresponding to two or more candidate radiation patterns. The exemplary method further comprises selecting, from the two or more sets of candidate antenna weights, at least one set of antenna weights for transmitting data to at least one receiving node based on the determined channel variability metrics, and transmitting data to the at least one receiving node using the selected antenna weights for each transmission.

An exemplary processor for use in antenna weight selection for transmitting data in a communication system from a transmitting node having multiple transmission antenna elements to a receiving node comprises a channel variability processor and a transmitter. The channel variability processor is configured to determine a channel variability metric for each of two or more sets of candidate antenna weights corresponding to two or more candidate radiation pattern. The transmitter transmits one or more of the channel variability metrics to a remote network node.

Another exemplary processor for use in antenna weight selection for transmitting data in a communication system from a transmitting node having multiple transmission antenna elements to a receiving node comprises a receiver and a selection processor. The receiver receives one or more of channel variability metrics from a remote network node. The selection processor is configured to select from two or more sets of candidate antenna weights, at least one set of antenna weights for transmitting data to at least one receiving node based on the received channel variability metrics.

DETAILED DESCRIPTION

Figure 1A:
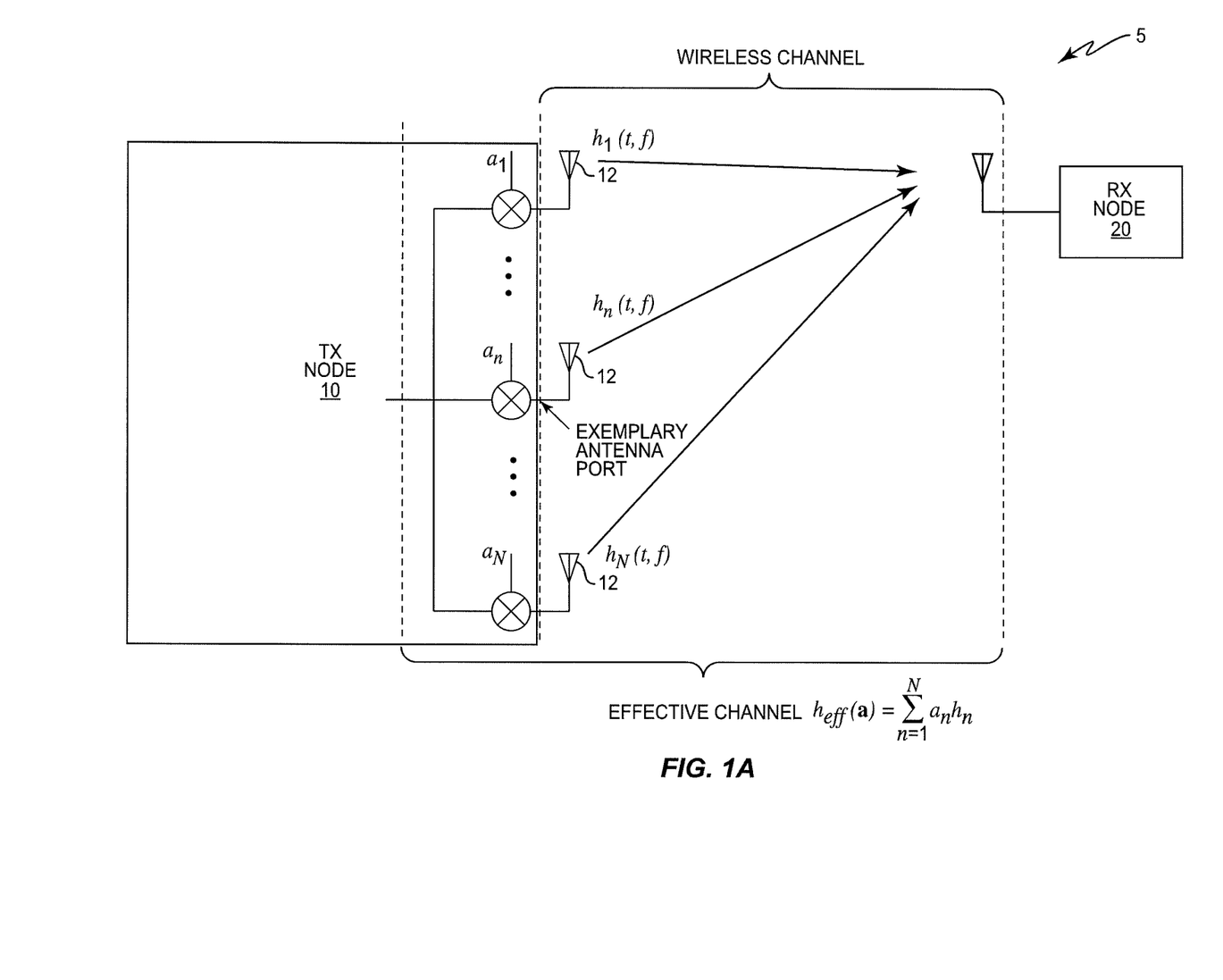
FIGS. 1A-1C show block diagrams for exemplary multi-antenna communication systems.
Figure 1B:
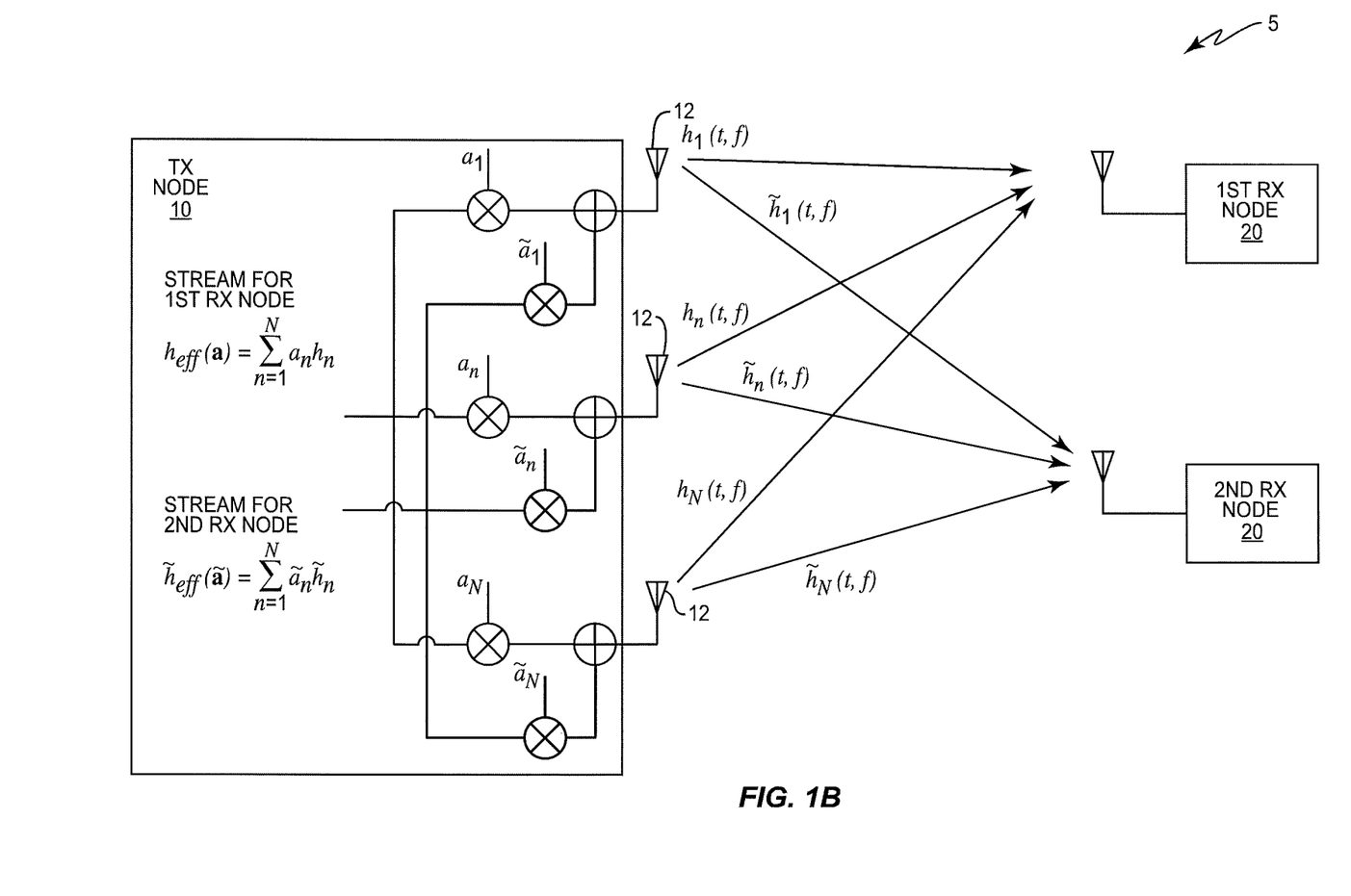
Figure 1C:
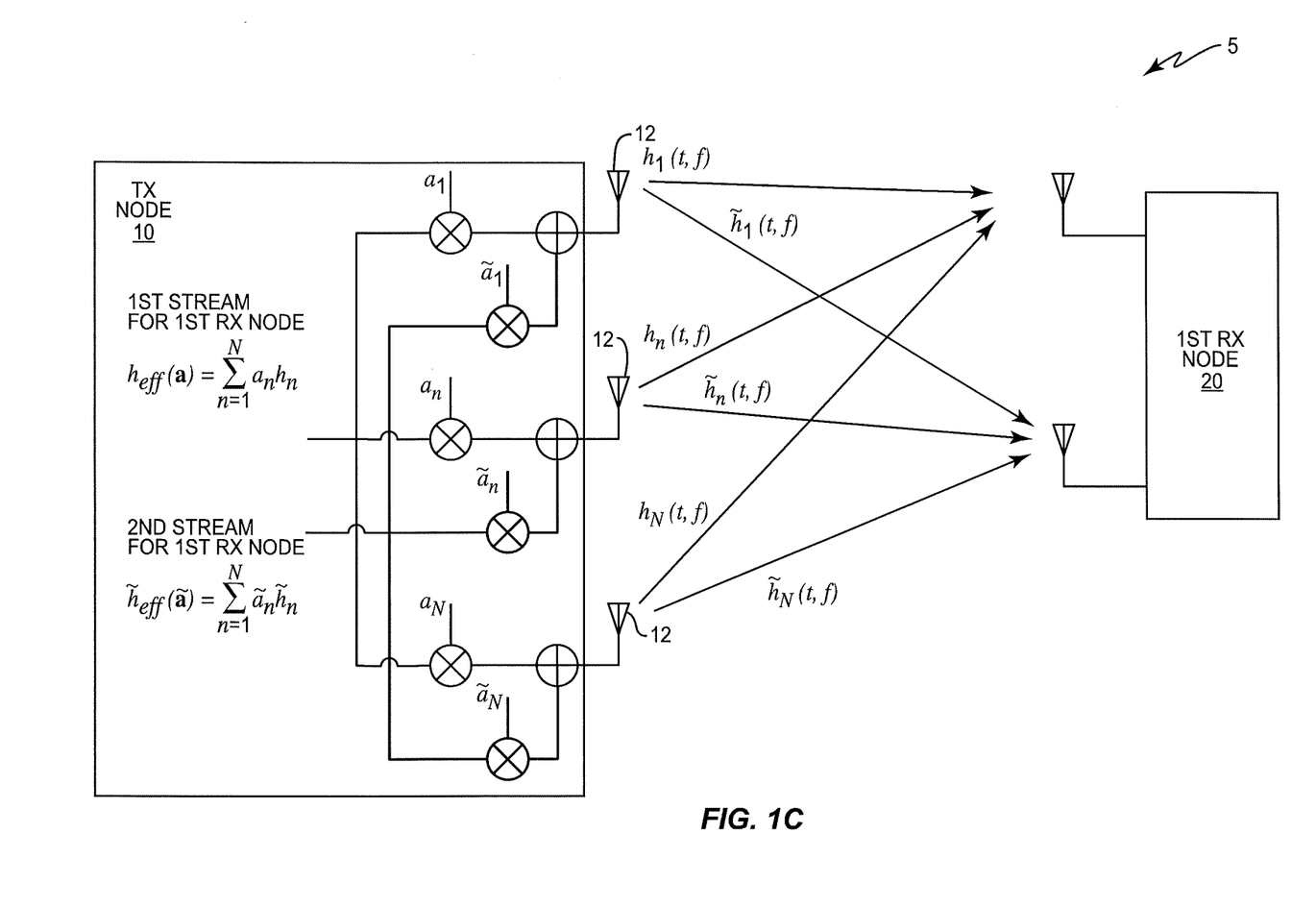

FIGS. 1A-1C show exemplary communication systems 5 comprising a transmitting node (TX node) 10 and a receiving node (RX node) 20, where the transmitting node 10 comprises multiple transmit antennas 12, which are also referred to herein as antenna elements 12, for transmitting data to the receiving node 20 via an effective channel. It will be appreciated that the terms "antennas" and "antenna elements" collectively include individual antennas and antenna elements, each having a corresponding antenna port, as well as a reconfigurable antenna comprising a group of antennas 12 or antenna elements 12 with one common antenna port, where the antenna port feeds the data for transmission to the corresponding antenna(s) 12. For example, each of the antennas 12 in FIG. 1A may correspond to a single antenna port. Alternatively, multiple ones of the antennas 12 may correspond to an antenna port. It will further be appreciated that the effective channel represents the combination of the radiation pattern corresponding to the multiple antennas 12 and the wireless channel between the transmitting node 10 and receiving node 20. More particularly, each effective channel represents a combination of the wireless channel from each of the transmit antennas 12 to the receiving node 20, wherein each of the wireless channels are weighted by the corresponding antenna weight.

FIG. 1A shows a communication system 5 comprising a multi-antenna transmitting node 10 communicating with a single receiving node 20. FIG. 1B shows a communication system 5 comprising a multi-antenna transmitting node 10 communicating with two receiving nodes 20. In this example, each antenna 12 transmits a combination of first and second streams respectively intended for first and second receiving nodes 20, where the wireless channel between a transmitting antenna 12 and the first receiving node 20 is represented by h and the wireless channel between a transmitting antenna 12 and the second receiving node 20 is represented by h̃. The first stream is weighted by a first set of antenna weights a and corresponds to a first effective channel $h_{eff}$, while the second stream is weighted by a second set of antenna weights ã and corresponds to a second effective channel $\tilde{h}_{eff}$. FIG. 1C shows a communication system 5 comprising a multi-antenna transmitting node 10 communicating with a single multi-antenna receiving node 20. In this example, each antenna 12 transmits a combination of first and second streams intended for the first receiving node 20, where the wireless channel between a transmitting antenna 12 and a first antenna of the first receiving node 20 is represented by h and the wireless channel between a transmitting antenna 12 and a second antenna of the receiving node 20 is represented by h̃. The first stream is weighted by a first set of antenna weights a and corresponds to a first effective channel $h_{eff}$, while the second stream is weighted by a second set of antenna weights ã and corresponds to a second effective channel $\tilde{h}_{eff}$. In general, the effective channel $h_{eff}$ can mathematically be described for each of the embodiments of FIGS. 1A-1C by:

$$h_{eff} = \sum_{n=1}^{N} a_n h_n, \quad (1)$$

where $h_n$ represents the wireless channel coefficient from antenna n of the transmitting node 10 to an antenna of the receiving node 20, and $a_n$ represents the antenna weight applied to antenna n of the transmitting node 10. This definition may be expanded for time-dependent and frequency-dependent channels, and for the scenario where the receiving node 20 includes multiple receive antennas, as shown in FIGS. 1B and 1C. Generally, however, the effective channel comprises the channel that can be observed between the antenna port(s) at the transmitting node 10 and the receiving node 20.

In one exemplary embodiment, the transmitting node 10 comprises a base station, NodeB, eNodeB, or other downlink transmitting node, while the receiving node 20 comprises a mobile station, UE, mobile terminal, or other downlink receiving node. It will be appreciated, however, that transmitting node 10 may alternatively comprise a mobile station, UE, mobile terminal, or other uplink transmitting node, while receiving node 20 may alternatively comprise a base station, NodeB, eNodeB, or other uplink receiving node. Further, it will be appreciated that the receiving node 20 may also include multiple antennas.

The antenna weight selection method and apparatus disclosed herein addresses problems associated with conventional antenna weight selection techniques by reducing the amount of feedback and/or feedback rates required for multi-antenna communications. To better understand the problems with conventional antenna weight selection techniques and the benefits of the antenna weight selection solution disclosed herein, the following briefly describes various multi-antenna scenarios in conjunction with FIGS. 2-5. In multi-antenna communications, radiation patterns are typically generated by transmitting the same signal from all antennas 12 but with different phase and/or amplitude weighting. The phase and/or amplitude weights can be applied digitally to the signals at baseband, or by using analogue circuits at baseband or RF, where the communication link between the transmitting node 10 and the receiving node 20 may be improved by optimizing the weights, subject to various constraints regarding the per-element and total output power, channel state information (CSI), and amount of feedback from the receiving node 20. A generated radiation pattern is the result of the application of a specific set of weights, e.g., an antenna weight vector, where the shape of the radiation pattern is a function of the corresponding array geometry (and polarizations where applicable) and the set of antenna weights. Further, a radiation pattern can have one or more directions of maximum radiation. For simplicity, all radiation patterns discussed herein are shown as single lobe patterns, such as would result from applying a set of antenna weights having a constant phase gradient to an array with a linear geometry with uniform antenna element spacing and a single polarization. It will be appreciated, however, that other radiation patterns, e.g., those resulting from arbitrary array geometries (including multiple polarizations) and weights. It should also be noted that multiple signal streams can be transmitted from the same set of antennas 12 by using a transmitter rank greater than one, where each signal stream would then be associated with a separate set of antenna weights.

Figure 2:
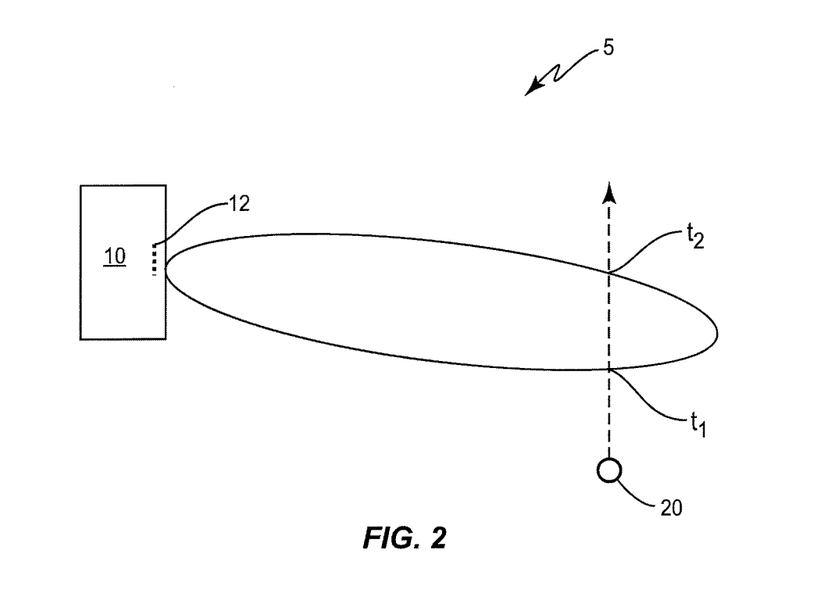
FIGS. 2 and 3 show exemplary radiation patterns for different numbers of antennas.
Figure 3:
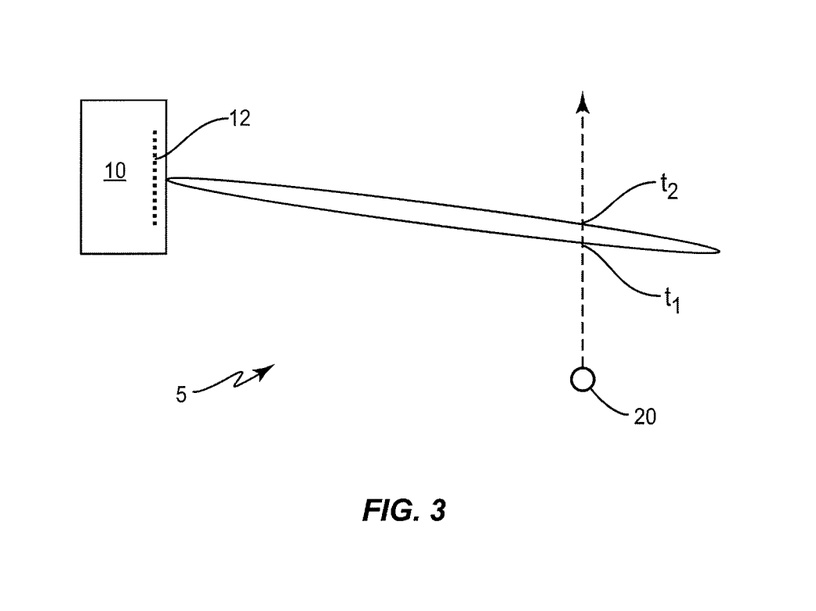

In general, the number of antennas 12 dictates the width of a radiation pattern, where the shape is generally determined by the weights applied to those antennas 12. For example, FIG. 2 shows a relatively wide radiation pattern generated by an array consisting of a relatively small number of antennas 12, while FIG. 3 shows a relatively narrow radiation pattern generated by an array consisting of a relatively large number of antennas 12. It will be appreciated that relatively narrow beams can also be created using a small number of antennas 12 having large antenna element spacings relative to the wavelength.

The time interval during which a certain set of antenna weights or radiation pattern is valid for a moving receiving node 20 is generally proportional to the width of the radiation pattern. In other words, a wider radiation pattern provides the desired coverage for a receiving node 20 moving at a certain velocity through the radiation pattern for a longer period of time than does a narrower radiation pattern. For example, the time a receiving node 20 is covered by a radiation pattern $(t_2-t_1)$ is longer for the wider radiation pattern of FIG. 2, than it is for the narrower radiation pattern of FIG. 3. Thus, determining the antenna weights for narrower radiation patterns generally require more feedback, which may require higher feedback rates, than determining antenna weights for wider radiation patterns.

Figure 4:
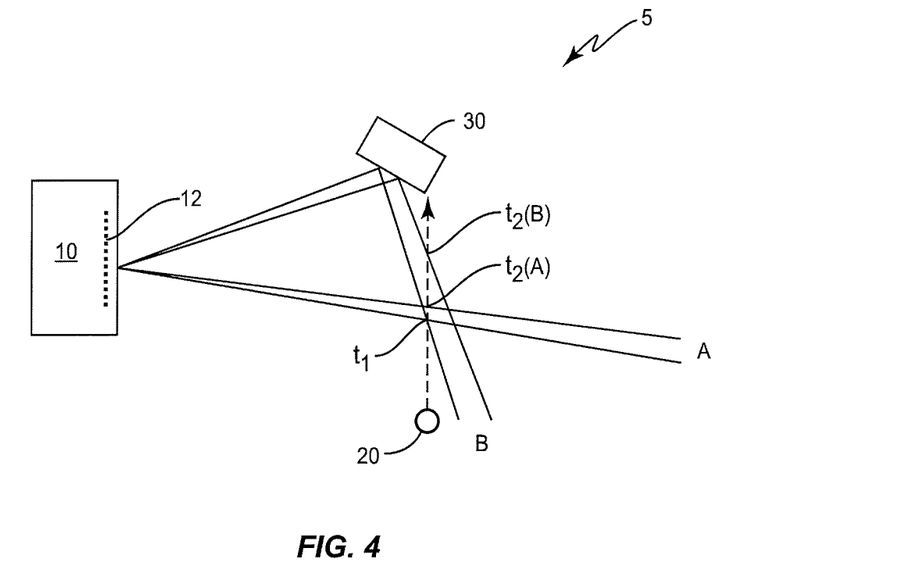
FIGS. 4 and 5 show the impact of exemplary scattering environments on the beam selection process.
Figure 5:
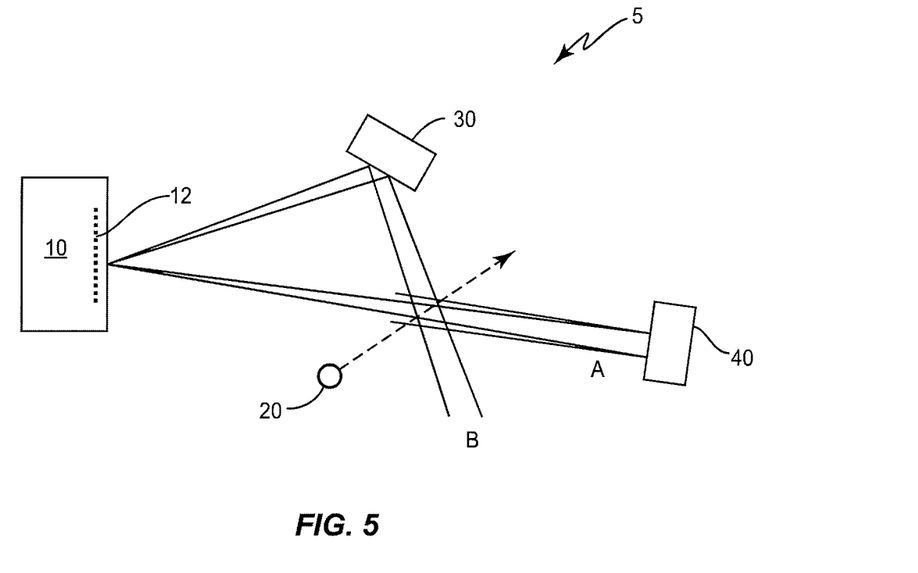

In many instances, wireless communications take place in a scattering environment, where one or more radiation patterns generated by a transmitting node 10 encounter one or more scattering objects 30, 40 such as shown in FIGS. 4 and 5. Exemplary scattering objects 30, 40 include, but are not limited to, buildings and other man-made structures, mountains, etc. In such environments, several possible beams illuminate the receiving node 20. Conventional systems may select the antenna weights that maximize the channel quality, e.g., by selecting the radiation pattern that maximizes the Signal-to-Noise Ratio (SNR), the Signal-to-Interference-plus-Noise Ratio (SINR), and/or the throughput. Such maximization can be either performed individually per receiving node 20 or jointly over multiple receiving nodes 20. Additional configuration of the link via receiving node scheduling, link adaptation, and rank selection may also take place. However, such conventional techniques do not take into account the effect that the selected set(s) of antenna weights can have on the dynamics of the channel. For example, consider the difference between radiation pattern A and radiation pattern B in FIG. 4. Radiation pattern A illuminates a moving receiving node 20 from an unfavorable direction for an undesirably short illumination time $t_2(A)-t_1$, resulting in an undesirably high feedback rate $R \propto (t_2(A)-t_1)^{-1}$ to prevent antenna gain loss resulting from pointing the radiation pattern in the wrong direction. However, because radiation pattern B illuminates the receiving node 20 from a more favorable direction (due to the scattering caused by object 30), the selected set(s) of antenna weights for radiation pattern B are valid for a significantly longer illumination time, e.g., $t_2(B)-t_1$, and thus have a relatively lower feedback rate $R \propto (t_2(B)-t_1)^{-1}$. Because conventional systems consider only channel quality, e.g., SNR, SINR, etc., conventional systems are more likely to select radiation pattern A instead of radiation pattern B, which results in the need for more feedback and/or higher feedback rates and thus higher overhead. The problems associated with the larger amounts of feedback and/or higher feedback rates are magnified when different sets of antenna weights are selected for different sub-bands of a frequency bandwidth, which requires even higher feedback granularity, and thus higher overhead.

Exemplary embodiments of the invention consider channel variability when selecting the set(s) of antenna weights. The selection may comprise a hard selection, where sets of antenna weights failing to satisfy a desired channel variability requirement are dismissed, or a soft selection, where sets of antenna weights resulting in smaller illumination times/higher feedback rates/larger amounts of feedback incur a higher penalty. By using channel variability information, the antenna selection process may be more robust against mobility and may provide gains over longer time periods. As discussed further herein, such channel variability information may comprise time and/or frequency variability metrics.

For example, radiation pattern A and radiation pattern B in FIG. 5 have similar time dynamics because the movement of the receiving node 20 relative to both radiation patterns is at similar angles. However, object 40 reflects radiation pattern A in such a way as to cause increased time dispersion for the data transmitted via radiation pattern A. Such increased time dispersion may result in an increased frequency selectivity because the direct and reflected waves may add in phase or out of phase depending on the relative path lengths and the wavelength. Radiation pattern B, on the other hand, will experience much less time dispersion. Conventional antenna weight selection techniques, however, do not consider such issues, and therefore, may not make the best selection for a given scenario. The antenna weight selection solution disclosed herein addresses this problem by considering the channel variability when selecting the set(s) of antenna weights.

Figure 6:
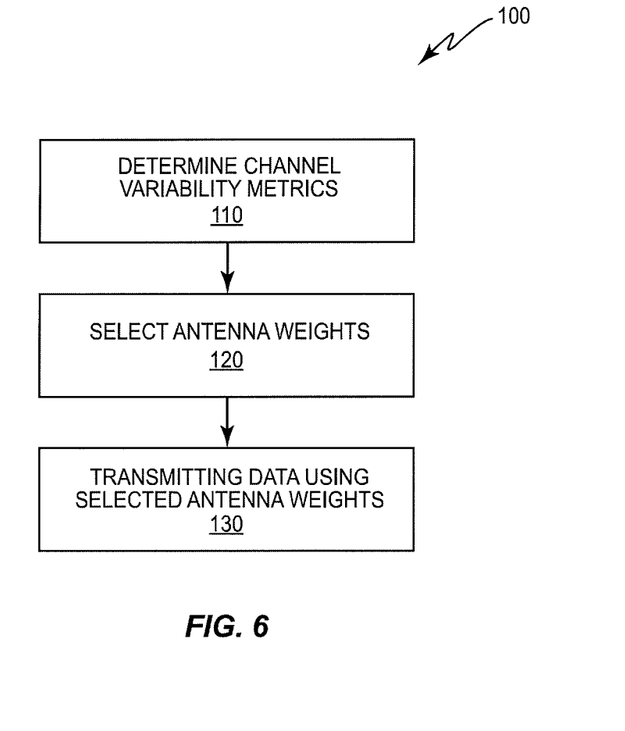
FIG. 6 shows a flow chart for an exemplary method of selecting antenna weights.

FIG. 6 shows an exemplary method 100 used to select antenna weights based on channel variability metrics. First, channel variability metrics are determined for two or more sets of candidate antenna weights (Block 110), where each set of candidate antenna weights directly or indirectly define a size, shape, etc., of a candidate radiation pattern available to transmit data to a receiving node 20. The term "candidate" as used herein represents those sets of antenna weights/radiation patterns available to the transmitting node 10. The sets of candidate antenna weights may or may not include all of the sets of antenna weights at the transmitting node. In some embodiments, the sets of candidate antenna weights may be those sets of antenna weights that satisfy a particular criterion, e.g., a signal-to-noise ratio criterion. In other embodiments, the transmitting and receiving nodes may previously agree to a candidate set of antenna weights, such as those antenna weights identified in codebook-based pre-coding. Alternatively, the candidate set may be unrestricted such that any possible combination of antenna weights satisfying some criterion, e.g., a power criterion, may be used, e.g., such as known for non-codebook based pre-coding. For example, the channel variability metrics may be determined for each set of candidate antenna weights based on channel estimates determined for an effective channel. Exemplary channel variability metrics include time variability metrics and/or frequency variability metrics. Subsequently, at least one of the sets of candidate antenna weights is selected based on the determined channel variability metrics (Block 120), where the selected set(s) of antenna weights are used to transmit data to a receiving node 20 in the communication system 5.

Figure 7:
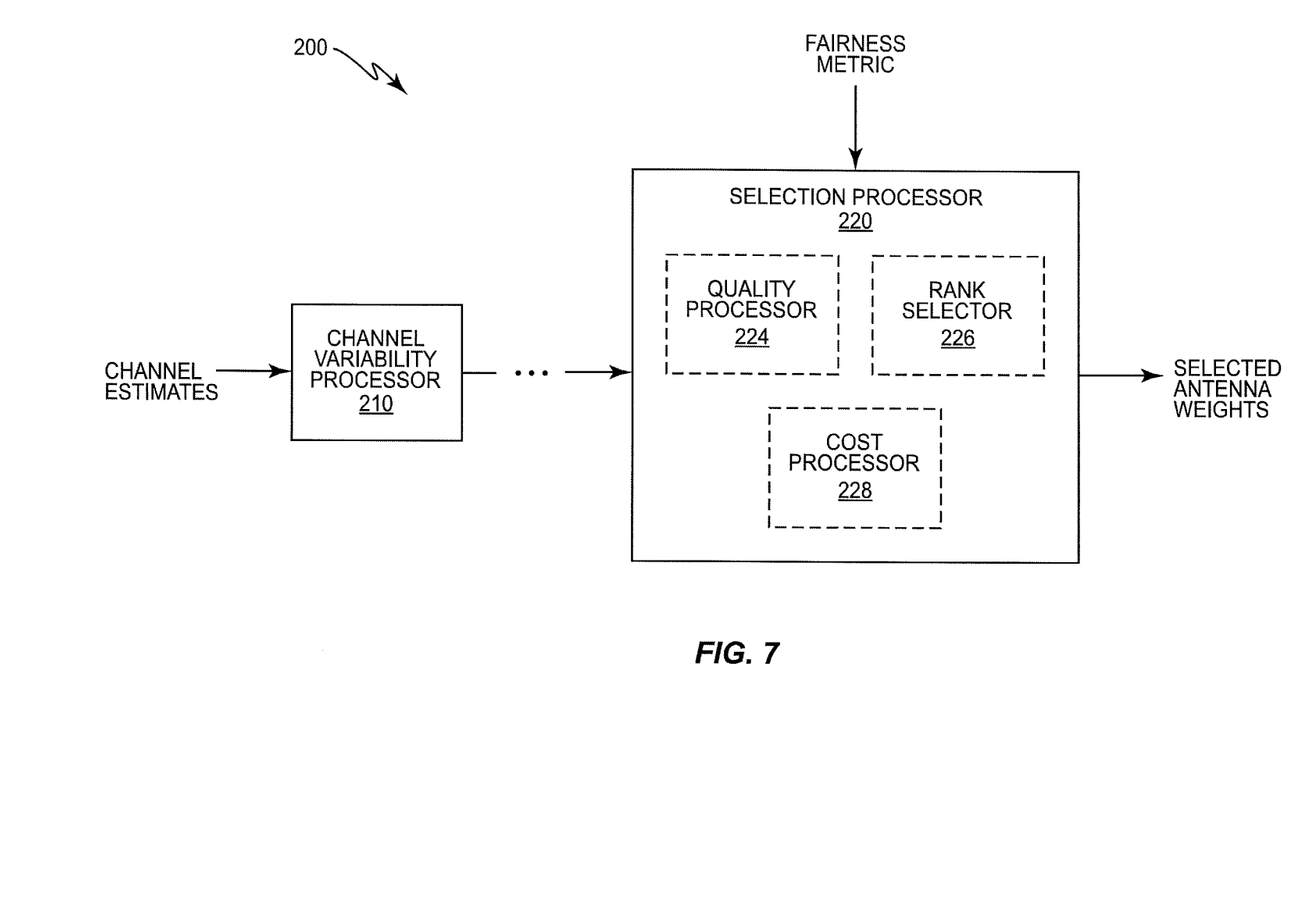
FIG. 7 shows an exemplary antenna weight selector.

FIG. 7 shows an antenna weight selector 200 that may be used to implement the antenna weight selection method 100 of FIG. 6. Antenna weight selector 200 comprises a channel variability processor 210 and a selection processor 220. Channel variability processor 210 determines the channel variability metrics for each set of candidate antenna weights, also referred to herein as candidate sets of antenna weights. Selection processor 220 selects one or more sets of antenna weights, which may be mathematically represented by antenna weight vectors, based on the channel variability metrics, where the selected antenna weights are used to generate one or more radiation patterns for transmitting data to a receiving node 20.

Figure 8:
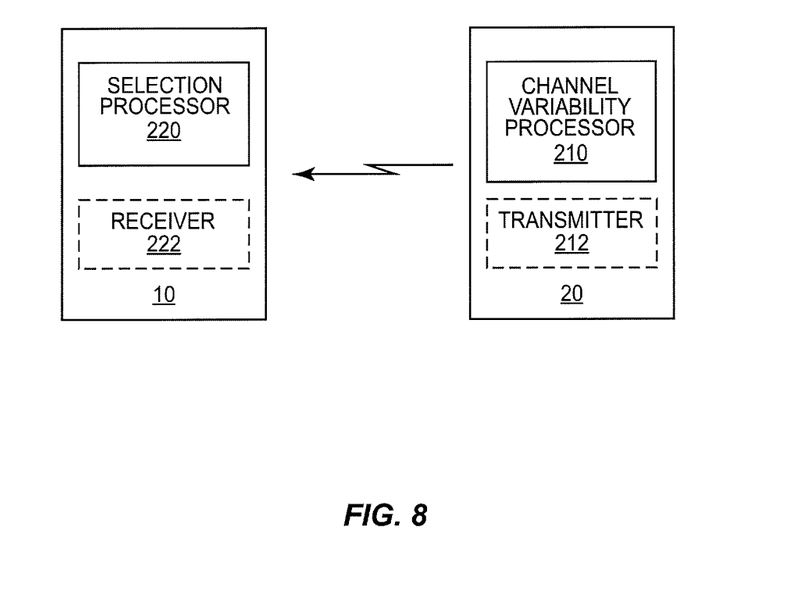
FIG. 8 shows an exemplary antenna weight selector distributed between multiple network nodes.

As shown in FIG. 8, the channel variability processor 210 and the selection processor 220 may be distributed between multiple network nodes. For example, the channel variability processor 210 may be located in a first network node, e.g., receiving node 20, while the selection processor may be located in another network node, e.g., transmitting node 10. In this case, the node 10, 20 containing the selection processor 220 includes a receiver 222 configured to receive the channel variability metric(s), and the node 20, 10 containing the channel variability processor 210 includes a transmitter 212 configured to transmit the channel variability metric(s). It will be appreciated that the receiver 222 and/or the transmitter 212 may be part of separate processors that respectively include the selection processor 220 and the channel variability processor 210. In one exemplary embodiment, the receiving node 20 may measure the channel variability, form channel variability metric(s), and transmit some or all of the channel variability metrics back to the transmitting node 10, which would subsequently select the appropriate set of antenna weights. For example, the receiving node 20 may transmit an indicator representing the type of metric (e.g., a frequency or a time variability metric) and/or an indicator of which set of candidate antenna weights the channel variability metric corresponds to along with a quantized version of the metric(s). Alternatively, the receiving node 20 may send information to the transmitting node 10 indicating which candidate sets of antenna weights do/do not have acceptable channel variability metrics. For example, the receiving node 20 may transmit a high/medium/low metric indicator with or without a metric type designation. In another example, the channel variability processor 210 may be further configured to select two or more preliminary sets of candidate antenna weights based on the channel variability metrics, where the receiving node 20 sends an indication of the selected preliminary sets to the transmitting node 10. It will be appreciated that the receiving node 20 may further provide the transmitting node 10 with the channel variability metrics associated with the selected preliminary sets of antenna weights and/or an indication of whether the channel variability metrics associated with the selected preliminary sets of antenna weights meet a threshold requirement. In this example, the selection processor 220 in the transmitting node 10 may select one or more sets of antenna weights from the received preliminary sets of antenna weights, e.g., based on the corresponding channel variability metrics, the indication of whether the channel variability metrics meet the threshold requirement, etc.

Figure 9:
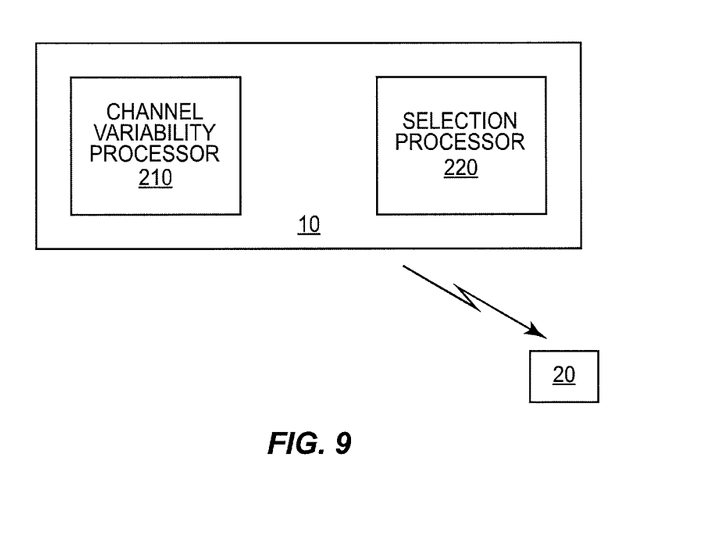
FIG. 9 shows an exemplary antenna weight selector located in a single network node.

In another example, the channel variability processor 210 and selection processor 220 are co-located in a single network node, e.g., transmitting node 10 as shown in FIG. 9, or receiving node 20. When the channel variability processor 210 and the selection processor 220 are both disposed, e.g., in the transmitting node, the transmitting node 10 may determine channel estimates by examining the transmission of the receiving node 20, and determine the channel variability metrics accordingly. This embodiment relies on an expectation of reciprocity in the radio propagation in each direction of transmission. Such an expectation is valid for transmission techniques that use time division duplex techniques, and is also valid for closely spaced antenna elements in a frequency division duplex system. Thus, when the transmitting node 10 examines the return link, it can determine the channel variability metrics of interest to be similar or identical to what may be expected during the transmission phase, provided the antenna weights on the receiving array are identical to those of the transmit array. If the channel variability processor 210 and the selection processor are both disposed in the receiving node 20 that node would make a selection and feed back its selection to the transmitting node 10. It will be appreciated that the transmitting node 10 may, in some cases, override or further reduce the selected set(s) of antenna weights based on other information that enables the transmitting node 10 to make a more informed decision, in addition to the channel variability metrics.

The channel variability processor 210 determines the channel variability metrics based on channel estimates determined for the corresponding effective channel. As used herein, the effective channel for a set of candidate antenna weights represents the combination of the radiation pattern produced by the set of candidate antenna weights and the corresponding wireless communication channel. The channel variability metrics determined by the channel variability processor 210 comprise time variability metrics representing the time variability of the corresponding wireless channels and/or frequency variability metrics representing the frequency variability of the corresponding wireless channels.

The channel variability processor 210 may determine the time variability metrics based on a Doppler spread, a level crossing rate, an average duration of fades, and/or a coherence time of the corresponding wireless channels, all of which are measured based on a sequence of current and/or past channel estimates $h(t_n)$, where $t_n$ represents a set of time instants. For example, processor 210 may determine the Doppler spectrum by taking the Fourier transform with respect to $t_n$ of the channel estimates to obtain $H(\upsilon_k)$, where $\upsilon_k$ represents a set of Doppler frequencies. The Doppler spread may subsequently be defined as the frequency interval between the lowest and highest frequency for which $|H(\upsilon_k)|$ exceeds some predetermined value, where a higher Doppler spread indicates a more rapidly varying channel.

Alternatively or additionally, processor 210 may determine the level crossing rate from the frequency at which $|h(t_n)|$ passes a predetermined value k with a positive slope. For example, for a total observation interval T, the processor 210 forms a logical vector $v(n)=|h(t_n)|>k$ and subsequently counts the number of times N that this vector changes from 0 to 1. The level crossing rate may then be defined as N/T, where a higher level crossing rate indicates a more rapidly varying channel.

The average duration of fades is related to the level crossing rate and may be determined from the same logical vector $v(n)=|h(t_n)|>k$. In this case, processor 210 determines the average length of the all-zero sections of v(n) to determine the average duration of fades, where a smaller average duration of fades indicates a more rapidly varying channel. For example, the vector v(n)32 [1 1 0 0 1 1 1 0 0 1 0 0 1 1], contains three all-zero sections, all of length two, which gives an average duration of fades of two samples.

Processor 210 may determine the sample autocorrelation function $R(\Delta_t)$ from the channel estimates according to:

$$R(\Delta_t)=E\{h(t_n)h^*(t_n-\Delta_t)\} \quad (2)$$

where $E\{\square\}$ represents an estimate of the expected value, $h(t_n)$ represents the channel estimates for the $t_n$ time instants, $\Delta_t$ represents a time shift, and * represents the complex conjugate. Subsequently, processor 210 may derive the coherence time from the autocorrelation function as the smallest time shift $\Delta_t$ for which $|R(\Delta_t)|$ is below some predefined threshold, where a smaller coherence time indicates a more rapidly varying channel.

The channel variability processor 210 may alternatively or additionally determine frequency variability metrics based on a power delay profile, a delay interval, a root-mean-square (RMS) delay spread, a level crossing rate, an average duration of fades, and/or a frequency autocorrelation function and coherence bandwidth of the of the corresponding wireless channels, all of which are measured based on a sequence of channel estimates for different carrier or subcarrier frequencies $H(f_k)$, where $f_k$ represents a set of frequencies. These measures are related to their time variability counterparts, where the main difference is that the measures are based on the Fourier transform of the channel estimates, $H(f_k)$ for different radio frequencies.

Processor 210 may determine the channel impulse response $h(\tau_n)$ by calculating an inverse Fourier transform of $H(f_k)$. The power delay profile $p(\tau)$ may be determined according to:

$$p(\tau) = |h(\tau)|^2, \qquad (3)$$

possibly with time averaging. Subsequently, the delay interval may be determined as the difference between the smallest and largest delay for which $|h(\tau_n)|$ or $p(\tau)$ exceeds a predetermined value. Similarly, processor 210 may determine the RMS delay spread as the square root of the second central moment of $|h(\tau_n)|^2$ or $p(\tau)$, where a larger delay interval or RMS delay spread indicates a more rapidly varying channel in the frequency dimension.

The processor 210 may determine the level crossing rate and the average duration of fades in the frequency dimension using the same calculations as in the time dimension by replacing $h(t_n)$ with $H(f_k)$. Similarly, a higher level crossing rate and a smaller average duration of fades indicate a more rapidly varying channel in the frequency domain.

Processor 210 may determine the frequency autocorrelation function according to:

$$R(\Delta_f) = E\{H(f_k)H^*(f_k - \Delta_f)\} \qquad (4)$$

where $E\{\square\}$ represents an estimate of the expected value, $H(f_k)$ represents the Fourier transform of the channel estimates for the $f_k$ frequencies, $\Delta_f$ represents a frequency shift, and * represents the complex conjugate. The processor 210 may derive the coherence bandwidth from the autocorrelation function from Equation (4) as the smallest frequency shift $\Delta_f$ for which $|R(\Delta_f)|$ is below a predetermined threshold value. Smaller coherence bandwidths indicate a more rapidly varying channel in the frequency dimension.

The previous examples indicate various examples of time and frequency variability metrics, and how they may be determined. It will be appreciated that the various variability metrics may be determined in ways other than those mentioned herein, e.g., any method for characterizing the variability known in the state of the art may be applied. Further, while the previous provided several exemplary calculations for determining a single variability metric, it will be appreciated that the variability metrics may also be determined by averaging multiple variability metrics over time and/or frequency. In addition, the channel variability processor 210 may also quantize the variability measures before passing these to the selection processor 220.

After the channel variability processor 210 determines the channel variability metric(s), selection processor 220 selects one or more sets of antenna weights from two or more candidate sets of antenna weights based on the channel variability metrics. For example, the selection processor may select the set(s) of antenna weights having the lowest channel variability metric(s), and/or the set(s) of antenna weights having channel variability metric(s) below a threshold. In some embodiments the selection processor 220 may select the sets of antenna weight by selecting at least one pre-coder index (PCI) from a codebook based on the channel variability metrics, where each PCI in the codebook corresponds to one candidate set of antenna weights. In any event, a transmitting node subsequently applies the selected set(s) of antenna weights to generate the corresponding radiation pattern(s) used to transmit data to one or more receiving nodes.

In some embodiments, the selection processor 220 may consider other factors in addition to the channel variability metrics when selecting the set of antenna weights. For example, selection processor 220 may select the set(s) of antenna weights based on one or more signal quality metrics and the channel variability metrics. In this embodiment, the selection processor 220 may include a quality processor 224 configured to determine one or more signal quality metrics corresponding to one or more transmitted signals, e.g., a signal-to-interference ratio (SIR), a signal-to-noise ratio (SNR), a signal-to-interference plus noise ratio (SINR), and/or a throughput metric. Selection processor 220 subsequently selects the set(s) of antenna weights based on the determined signal quality metric(s) and channel variability metric(s). For example, the selection processor 220 may select the set of antenna weights according to:

$$a_n = \arg\max\{\text{SINR}_n - f(v_n)\}, \qquad (5)$$

where $a_n$ represents the $n^{th}$ vector of candidate antenna weights, $\text{SINR}_n$ represents the SINR for the radiation pattern resulting from the $n^{th}$ candidate antenna weight vector, $v_n$ represents the channel variability associated with the $n^{th}$ antenna weight vector, and $f(v_n)$ represents a channel variability function. In one embodiment, the channel variability function may be defined according to:

$$f(v_n) = \sum_m \alpha_m v_{n,m}, \qquad (6)$$

where $v_{n,m}$ represents the $m^{th}$ channel variability metric for the $n^{th}$ antenna weight vector and $\alpha_m$ represents them $m^{th}$ antenna weight in the antenna weight vector. In one embodiment, the selection processor 220 may rank the candidate sets of antenna weights based on the signal quality metric(s), and then select one or more sets of antenna weights according to the ranking and based on the channel variability metrics.

In another embodiment, which may be used for MIMO communications, selection processor 220 may include a rank selector 226, which determines a transmission rank, e.g., a number of signals to transmit simultaneously (in parallel) from the transmitting node to the same receiving node, based on the selected set(s) of antenna weights. More particularly, the rank selector 226 determines a number N of candidate sets of antenna weights satisfying a channel variability requirement, and selects the transmission rank based on N. The transmitting node 10 subsequently transmits data to the receiving node 20 using the selected weights and according to the transmission rank. For example, in MIMO communications, one radiation pattern may be used to transmit one data stream. The rank selector 226 may select a low rank transmission when only a few sets of antenna weights, and thus only a few radiation patterns, satisfy a desired channel variability constraint because in this case, only these few radiation patterns are acceptable to use for transmitting the signals (one radiation pattern per rank).

In still another embodiment, selection processor 220 may select the sets of antenna weights based on the channel variability metrics and a performance cost, e.g., a power cost and/or a signal quality cost. In this embodiment, the selection processor 220 may include a cost processor 228 configured to determine the performance cost associated with each of the candidate sets of antenna weights, where the selection processor 220 selects the set(s) of antenna weights based on the determined performance costs and the channel variability metrics. For example, a higher cost may be incurred for those sets of antenna weights having a higher channel variability. The selection processor 220 may thus use the performance cost information to resolve tradeoffs between multiple candidate sets of antenna weights under different circumstances.

In some embodiments, selection processor 220 may also use the channel variability metrics to jointly select both which receiving node(s) 20 should receive data and what set(s) of antenna weights should be used to transmit data to the corresponding receiving nodes. For example, the selection processor may select one or more receiving nodes 20 based on the channel variability metrics in cooperation with a user selection metric, e.g., a fairness metric. One exemplary fairness metric may comprise the ratio of instantaneous estimated data rate to an average achieved data rate. In another example, the fairness metric may comprise a priority metric that selects all receiving nodes 20 having a priority above a predetermined threshold, where the selection processor 220 subsequently selects sets of antenna weights for the selected receiving nodes 20 based on the channel variability metric(s). For example, the priority may be based on a signal quality metric. In particular, the selection processor 220 may select the set(s) of antenna weights for the highest priority receiving node 20 while accounting for channel variability constraints. Subsequently, the selection processor 220 may select the set(s) of antenna weights for the next highest priority receiving node 20 while accounting for channel variability constraints, where the channel variability constraints are successively lowered as necessary until a threshold is reached. The selection processor 220 may further select the receiving node(s) 20 based on a beam separation associated with different receiving nodes 20. The beam separation option is for situations where it would be beneficial to transmit simultaneously to receiving nodes 20 for which the associated beams are highly separated because the interference between these receiving nodes would thus be reduced.

In some scenarios, e.g., those that do not involve codebooks or PCIs, it may be beneficial to weight and combine multiple sets of antenna weights selected based on the channel variability metrics, and then use the radiation pattern resulting from the combined sets of antenna weights to transmit data to a receiving node 20. For example, the sets of antenna weights having a lower channel variability may be given a higher weight. In one embodiment, the beam weighting may be performed according to:

$$b_n = SINR_n - \alpha v_n \text{ and} \quad (7)$$

$$a_{final} = \sum_n \frac{b_n}{\sum_m b_m} a_n \quad (8)$$

where $b_n$ represents the weighting determined for the $n^{th}$ vector of antenna weights, $b_m$ represents the weighting determined for the $m^{th}$ vector of antenna weights $\alpha$ represents a weighting for $v_n$, $SINR_n$ represents the signal-to-interference plus noise ratio for the $n^{th}$ vector of antenna weights, $a_n$ represents the selected antenna weight vector for the $n^{th}$ radiation pattern, and $a_{final}$ represents the final antenna weight vector obtained from the weighted sum of the selected antenna weights. It will be appreciated that $a_{final}$ may be constrained before being applied by a transmitting node 10 to make sure other transmission requirements, e.g., a power limit, are not violated. Such a weighted combination solution may be advantageous, e.g., for diversity purposes or for adding robustness to scenarios where there is a low confidence in the accuracy of the channel estimates used to determine the channel variability metrics. In addition, the weighted combination solution may be used to create a robustness in the selection procedure disclosed herein, where the selection of a set of antenna weights associated with a radiation pattern having a higher signal quality, e.g., SINR, and a higher channel variability may be balanced with the selection of a set of antenna weights associated with a radiation pattern having a lower signal quality and a lower channel variability.

The solution disclosed herein provides several advantages over conventional solutions. First, the disclosed solution provides a selection process that is more robust against mobility and/or frequency selectivity. The increased mobility robustness enables closed-loop operation at higher receiver and/or transmitting node speeds, which results in better antenna gains, and therefore, better channel quality relative to open-loop solutions. The increased frequency selectivity robustness enables less stringent requirements on feedback granularity and better channel quality in the case where, e.g., one set of antenna weights and transmission rank is used for the entire bandwidth. In addition, because the channel variability typically scales with frequency and because narrower beams are possible at higher frequencies, the advantages of the solution disclosed herein may be particularly relevant for high carrier frequencies.

As used herein, the term "processor" includes hardware and/or software (including firmware, resident software, micro-code, etc.), which may, for example, be embodied in an application specific integrated circuit (ASIC). The term "processor" as used herein may also take the form of a computer program product on a computer-usable or computer-readable storage medium having computer-usable or computer-readable program code embodied in the storage medium for use by or in connection with an instruction execution system. In the context of this document, a computer-usable or computer-readable medium may be any medium that can contain, store, communicate, propagate, or transport the program for use by or in connection with the instruction execution system, apparatus or device. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, or a portable compact disc read-only memory (CD-ROM). Note that the computer-usable or computer-readable medium could even be paper or another suitable medium upon which the program is printed, as the program can be electronically captured via, for example, optical scanning or the paper or other medium, then compiled, interpreted, or otherwise processed in a suitable manner, if necessary, and then stored in a computer memory.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An antenna weight selector for transmitting data in a communication system from a transmitting node having multiple transmission antenna elements to a receiving node, the antenna weight selector comprising:
    a channel variability processor configured to determine a channel variability metric for each of two or more sets of candidate antenna weights corresponding to two or more candidate radiation patterns; and
    a selection processor configured to select, from the two or more sets of candidate antenna weights, at least one set of antenna weights for transmitting data to at least one receiving node based on the determined channel variability metrics;
    wherein the selection processor comprises a transmission rank selector configured to determine a number of candidate sets of antenna weights satisfying a channel variability requirement and to select at least one transmission rank based on the number, said at least one transmission rank representing a number of data signals to be transmitted simultaneously from the transmitting node to at least one receiving node.

2. The antenna weight selector of claim 1 wherein the selection processor is configured to select the at least one set of antenna weights having the lowest channel variability metric.

3. The antenna weight selector of claim 1 wherein the selection processor is configured to select the at least one set of antenna weights having the channel variability metric below a threshold.

4. The antenna weight selector of claim 1 wherein the selection processor comprises a quality processor configured to determine a signal quality metric corresponding to one or more transmitted signals, and wherein the selection processor is further configured to select the at least one set of antenna weights based on the signal quality metrics and the channel variability metrics.

5. The antenna weight selector of claim 4 wherein the selection processor selects the at least one set of antenna weights by ranking the candidate sets of antenna weights based on the one or more signal quality metrics and selecting the at least one set of the highest ranked candidate sets of antenna weights according to the ranking based on the channel variability metrics.

6. The antenna weight selector of claim 1 wherein the selection processor selects the at least one set of antenna weights by selecting at least one pre-coder index from a codebook based on the determined channel variability metrics, where each pre-coder index in the codebook corresponds to one of the candidate sets of antenna weights.

7. The antenna weight selector of claim 1 wherein the channel variability processor determines the channel variability metric for each set of candidate antenna weights based on corresponding channel estimates determined for each effective channel, each of said effective channels representing a combination of a wireless channel from each of a plurality of transmit antenna elements to the receiving node, wherein each of the wireless channels are weighted by the corresponding antenna weight.

8. The antenna weight selector of claim 1 wherein the channel variability metric comprises one of a time variability metric representing the time variability of corresponding wireless communication channels, a frequency variability metric representing the frequency variability of the corresponding wireless communication channels, and a combined variability metric derived from the time and frequency variability metrics.

9. The antenna weight selector of claim 1 wherein the selection processor is further configured to select one or more receiving nodes to receive transmitted data based on the channel variability metric in cooperation with a user selection metric.

10. The antenna weight selector of claim 1 wherein the selection processor comprises a cost processor configured to determine a performance cost associated with each of the candidate sets of antenna weights, and wherein the selection processor selects the at least one set of antenna weights based on the determined performance costs and the channel variability metrics.

11. The antenna weight selector of claim 1 wherein the channel variability processor and the selection processor are distributed between multiple network nodes, wherein the selection processor comprises a receiver configured to receive the channel variability metric determined for each of the sets of candidate antenna weights from at least one other network node.

12. The antenna weight selector of claim 1 wherein the channel variability processor and the selection processor are distributed between multiple network nodes, wherein the channel variability processor is further configured to select two or more preliminary sets of candidate antenna weights for the transmitting node based on the determined channel variability metrics, wherein the selection processor comprises a receiver configured to receive the two or more preliminary sets of antenna weights from at least one other network node, and wherein the selection processor selects the at least one set of antenna weights for transmitting data from the two or more preliminary sets of antenna weights received from the at least one other network node.

13. The antenna weight selector of claim 1 wherein the channel variability processor and the selection processor are co-located in a network node.

14. A method of selecting antenna weights to be used for transmitting data in a communication system from a transmitting node having multiple transmission antenna elements to a receiving node, the method comprising:
    determining a channel variability metric for each of two or more sets of candidate antenna weights corresponding to two or more candidate radiation patterns;
    selecting, from the two or more sets of candidate antenna weights, at least one set of antenna weights for transmitting data to at least one receiving node based on the determined channel variability metrics;
    transmitting data to said at least one receiving node using the selected antenna weights for each transmission; and
    determining a number of candidate sets of antenna weights satisfying a channel variability requirement, and selecting a transmission rank based on the number, said transmission rank representing a number of data signals to be transmitted simultaneously from the transmitting node.

15. The method of claim 14 wherein selecting the at least one set of antenna weights comprises selecting the at least one set of antenna weights having the lowest channel variability metric.

16. The method of claim 14 wherein selecting the at least one set of antenna weights comprises selecting the at least one set of antenna weights having a channel variability metric below a threshold.

17. The method of claim 14 further comprising determining a signal quality metric corresponding to one or more transmitted signals, wherein selecting the at least one set of antenna weights comprises selecting the at least one set of antenna weights based on the signal quality metrics and the channel variability metrics.

18. The method of claim 17 further comprising ranking the candidate sets of antenna weights based on the one or more signal quality metrics, wherein selecting the at least one set of antenna weights comprises selecting the at least one set of the highest ranked candidate sets of antenna weights based on the channel variability metrics.

19. The method of claim 14 wherein selecting the at least one set of antenna weights comprises selecting at least one pre-coder index from a codebook based on the determined channel variability metrics, where each pre-coder index in the codebook corresponds to one of the candidate sets of antenna weights.

20. The method of claim 14 further comprising determining channel estimates for each effective channel, each of said effective channels representing a combination of a wireless channel from each of a plurality of transmit antenna elements to the receiving node, wherein each of the wireless channels are weighted by the corresponding antenna weight, wherein determining the channel variability metric comprises determining the channel variability metric for each set of candidate antenna weights based on the determined channel estimates of the corresponding effective channel.

21. The method of claim 14 wherein determining the channel variability metric comprises one of determining a time variability metric representing the time variability of corresponding wireless channels, determining a frequency variability metric representing the frequency variability of the corresponding wireless channels, and determining a combined variability metric derived from the time and frequency variability metrics.

22. The method of claim 14 wherein further comprising selecting one or more receiving nodes to receive transmitted data based on the channel variability metric in cooperation with a user selection metric.

23. The method of claim 14 further comprising determining a performance cost associated with each of the candidate sets of antenna weights, wherein selecting the at least one set of antenna weights comprises selecting the at least one set of antenna weights based on the determined performance costs and the channel variability metrics.

24. The method of claim 14 further comprising receiving, at a first network node, the channel variability metric determined for each of the two or more sets of candidate antenna weights from at least one other network node.

25. The method claim 14 further comprising receiving, at a first network node, two or more preliminary sets of antenna weights from at least one other network node, wherein selecting the at least one set of antenna weights comprises selecting at least one set of antenna weights for transmitting data from the received two or more preliminary sets of antenna weights.

26. The method of claim 14 further comprising receiving, at a first network node, the at least one set of selected antenna weights from at least one other network node.

27. A processor for use in antenna weight selection for transmitting data in a communication system from a transmitting node having multiple transmission antenna elements to a receiving node, the processor comprising:
   a channel variability processor configured to determine a channel variability metric for each of two or more sets of candidate antenna weights corresponding to two or more candidate radiation pattern; and
   a transmitter to transmit one or more of the channel variability metrics to a selection processor in a remote network node, to facilitate the selection by the selection processor of at least one set of antenna weights, based on the transmitted one or more channel variability metrics, for transmitting the data to the receiving node, to facilitate the determination by the selection processor of a number of candidate sets of antenna weights satisfying a channel variability requirement, and to facilitate the selection by the selection processor of a transmission rank based on the number, said transmission rank representing a number of data signals to be transmitted simultaneously from the transmitting node.

28. A processor for use in antenna weight selection for transmitting data in a communication system from a transmitting node having multiple transmission antenna elements to a receiving node, the processor comprising:
   a receiver to receive one or more of channel variability metrics from a remote network node; and
   a selection processor configured to select from two or more sets of candidate antenna weights, at least one set of antenna weights for transmitting data to at least one receiving node based on the received channel variability metrics;
   wherein the selection processor is further configured to determine a number of candidate sets of antenna weights satisfying a channel variability requirement, and select a transmission rank based on the number, said transmission rank representing a number of data signals to be transmitted simultaneously from the transmitting node.

* * * * *